United States Patent [19]
Kawano et al.

[11] Patent Number: 5,635,111
[45] Date of Patent: Jun. 3, 1997

[54] METHOD OF MANUFACTURING A PHOSPHOR FOR USE IN AN ELECTROLUMINESCENT PANEL

[75] Inventors: Kenichi Kawano, Machida; Mitsunori Harada; Takahiro Saida, both of Yokohama; Shuichi Taya, Hadano; Shinichiro Seki, Machida; Kenichi Kondo, Tokyo, all of Japan

[73] Assignee: Stanley Electric Co., Ltd., Tokyo, Japan

[21] Appl. No.: 617,166

[22] Filed: Mar. 18, 1996

Related U.S. Application Data

[62] Division of Ser. No. 246,639, May 20, 1994, Pat. No. 5,525,313.

[30] Foreign Application Priority Data

May 25, 1993 [JP] Japan .................................. 5-122587

[51] Int. Cl.$^6$ ................................ C09K 11/54; C09K 11/56
[52] U.S. Cl. ........................... 252/301.65; 252/301.6 R
[58] Field of Search ..................... 252/301.65, 301.6 R

[56] References Cited

U.S. PATENT DOCUMENTS

| | | | |
|---|---|---|---|
| 2,593,015 | 4/1952 | Dreher | 263/48 |
| 2,982,740 | 5/1961 | Goldberg et al. | 252/301.6 S |
| 3,767,459 | 10/1973 | Kingsley et al. | 117/100 B |
| 3,957,678 | 5/1976 | Dikhoff et al. | 252/301.65 |
| 4,265,661 | 5/1981 | Ware | 75/135 |
| 4,374,037 | 2/1983 | Takahashi | 252/301.4 S |
| 4,650,539 | 3/1987 | Irvine et al. | 156/613 |
| 4,874,985 | 10/1989 | Hase et al. | 313/487 |
| 5,217,695 | 6/1993 | Augustine et al. | 422/111 |

FOREIGN PATENT DOCUMENTS 3-257790  11/1991  Japan ................. 252/301.6 S

*Primary Examiner*—Melissa Bonner
*Attorney, Agent, or Firm*—Fish & Richardson P.C.

[57] ABSTRACT

A phosphor for use in an electroluminescent panel is produced by firing a material primarily composed of powder of zinc sulfide, preferably with high-frequency induction heating, under a predetermined pressure in an atmosphere of a halogen gas as a coactivator. The phosphor thus produced is of good emission characteristics having minimum particle size and impurity concentration irregularities.

3 Claims, 7 Drawing Sheets

METHOD OF MANUFACTURING A PHOSPHOR FOR USE IN AN ELECTROLUMINESCENT PANEL

This is a divisional of Ser. No. 08/246,639 filed May 20, 1994, now U.S. Pat. No. 5,525,313.

BACKGROUND OF THE INVENTION

1. Field of the Invention

The present invention relates to a phosphor of good emission characteristics for use in various display devices such as electroluminescent display (EL) panels or the like, and an apparatus for and a method having manufacturing such a phosphor with high reproducibility.

2. Description of the Related Art

Phosphors for use in EL panels, for example, are usually made of zinc sulfide (ZnS) with an activator of copper (Cu), a coactivator of bromine (Br), and a coactivator of chlorine (Cl) added thereto. Since the service life of phosphors and the brightness thereof upon emission depend greatly upon the concentrations of the activator and coactivators added and the particle size of the phosphors, it is important that the amounts of the activator and coactivators added, i.e., the concentrations of impurities added, be controlled appropriately.

To manufacture such a phosphor for use in an electroluminescent panel, hereinafter referred to as an EL phosphor, as shown in FIG. 1 of the accompanying drawings, it has heretofore been customary to add, to a material 30 of zinc sulfide, 0.1~1.0 mol % of a copper salt such as copper acetate or copper sulfate, and 0.1~20 mol % of ammonium bromide or ammonium chloride, mix the materials well, store the mixture in an ampul 32 of quartz or the like closed by a cap 31, place the ampul 32 in a reactor 33 of an electric furnace 35, and energize a heater 34 of the electric furnace 35 with the reactor 33 being filled with a hydrogen sulfide ($H_2S$) or nitrogen ($N_2$) gas atmosphere for thereby firing the mixture at a temperature ranging from 700° to 1200° C. until the mixture is turned into particles of suitable size.

Because excessive copper or the like is attached to the surface of the EL phosphor thus manufactured, the EL phosphor is then washed with a solution of sodium cyanide or the like and dried into an EL phosphor product.

In the conventional manufacturing apparatus, ammonium bromide or ammonium chloride is added as a coactivator for copper and also as a promoter for increasing the particle size of the EL phosphor. Since ammonium bromide and ammonium chloride have low subliming points of 542° C. and 337.8° C., respectively, they would sublime almost entirely at the firing temperature ranging from 700° to 1200° C.

To avoid such unwanted sublimation, zinc sulfide with an impurity such as of ammonium bromide or ammonium chloride added is placed in the ampul 32, and the ampul 32 is closed by the cap 31 to prevent the added ammonium bromide or ammonium chloride from subliming while the particle size of the EL phosphor is increasing, i.e., the crystal of the EL phosphor is growing.

The conventional manufacturing apparatus which employs the ampul 32 closed by the cap 31 has had a problem because the manufactured EL phosphor suffers particle size irregularities and impurity concentration variations depending on the shape and volume of the ampul 32 and the gap between the ampul 32 and the cap 31. Therefore, the conventional manufacturing apparatus fails to manufacture EL phosphors with high reproducibility, and EL phosphors manufactured by the conventional manufacturing apparatus have widely different emission characteristics.

SUMMARY OF THE INVENTION

It is therefore an object of the present invention to provide an EL phosphor having good emission characteristics for use in display devices.

Another object of the present invention is to provide an apparatus for, and a method of, manufacturing EL phosphors having minimum particle size and impurity concentration irregularities with high reproducibility.

According to the present invention, there is provided a phosphor for use in an electroluminescent panel, made of fired zinc sulfide with copper added in a concentration ranging from 0.1 to 0.5 mol % and bromine added in a concentration ranging from 0.1 to 0.5 mol %, and having a particle size ranging from 10 to 30 µm.

There is also provided a phosphor for use in an electroluminescent panel, made of fired zinc sulfide with copper added in a concentration ranging from 0.1 to 0.5 mol % and iodine added in a concentration ranging from 0.05 to 0.3 mol %, and having a particle size ranging from 10 to 30 µm.

There is also provided a phosphor for use in an electroluminescent panel, made of fired zinc sulfide with copper added in a concentration ranging from 0.1 to 0.5 mol % and chlorine added in a concentration-ranging from 0.1 to 0.5 mol %, and having a particle size ranging from 10 to 30 µm.

The phosphors have a high emission brightness, a long service life, and produce good color tones as the dopants and the average particle size have a standard deviation of 1% or less.

According to the present invention, there is further provided an apparatus for manufacturing a phosphor for use in an electroluminescent panel, comprising a gas supply section for introducing a nitrogen gas and a halogen gas, an open boat assembly for supporting a phosphor material, a storage body for storing the open boat therein, the storage body being permeable to a fluid, a reactor, the gas supply section, the open boat, and the storage body being housed in the reactor, a heating device for heating the reactor, pressure control means for selectively evacuating the reactor and introducing an atmospheric pressure into the reactor while controlling the pressure in the reactor in the range from $10^{-3}$ to 1140 Torr, and a discharge gas processing device for processing a toxic gas discharged from the reactor. While the reactor is being kept at a predetermined temperature therein and a predetermined pressure is being developed in the reactor, a halogen gas is introduced into the reactor, and the phosphor material is fired.

The open boat assembly may comprise a semicylindrical boat of quartz and a semicylindrical apertured cover of quartz mounted on the semicylindrical boat, and the storage body comprises a cylindrical carbon block. Alternatively, the open boat assembly may comprise a rectangular boat of quartz, and the storage body may comprise a rectangular carbon block, which may have opposite vertical panels thicker than other panels thereof. The phosphor material may comprise powder of zinc sulfide. The halogen gas introduced by the gas supply section may comprise a hydride of bromine, iodine, or chlorine. Preferably, the heating device may comprise a high-frequency induction heating device.

According to the present invention, there is also provided a method of manufacturing a phosphor for use in an electroluminescent panel, comprising the steps of placing a material primarily composed of powder of zinc sulfide in a cylindrical storage body which is permeable to a fluid, housing the cylindrical storage body in a reactor of a heating furnace, keeping the interior of the reactor at a predetermined temperature, developing a predetermined pressure in the reactor, and firing the material in an atmosphere of a halogen gas as a coactivator.

By controlling the predetermined temperature in the range of from 550° C. to 1200° C., the predetermined pressure in the range of from $10^{-3}$ Torr to 1140 Torr, and a dopant concentration in the range of from 0 to 0.5 mol %, it is possible to produce a phosphor with particle size and dopant concentration irregularities kept at or below a standard deviation of 1%. The phosphor thus manufactured has good emission characteristics with minimum particle size and impurity concentration irregularities.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 2:
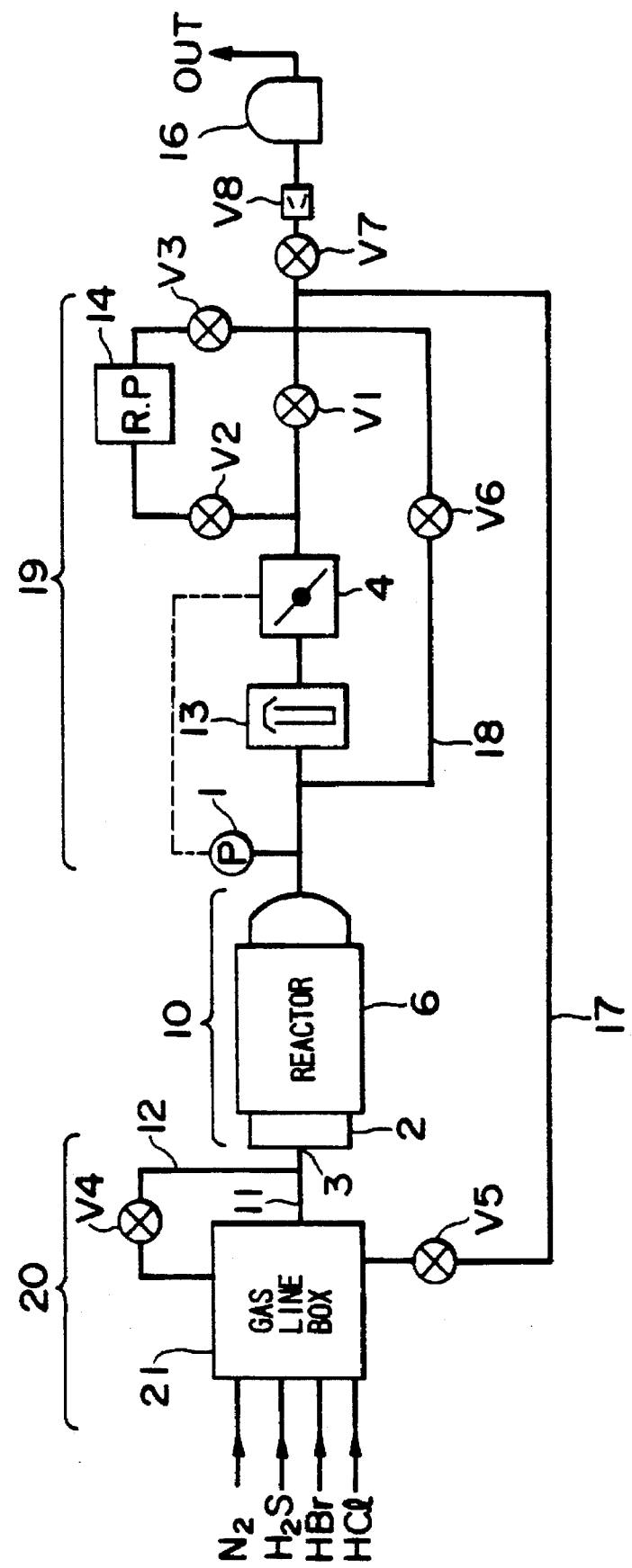
FIG. 2 is a schematic block diagram of an apparatus for manufacturing an EL phosphor according to the present invention.

As shown in FIG. 2, an apparatus for manufacturing an EL phosphor for use in a display device such as an EL panel according to the present invention generally comprises a gas supply section 20, a high-frequency induction heating furnace 10, and a pressure control section 19.

The gas supply section 20 has a gas line box 21 for controlling the rate of flow of a nitrogen gas, a hydrogen sulfide gas, a bromine gas, or a chlorine gas and also controlling the type of a gas to be introduced into a reactor 2, a gas inlet pipe 11 of quartz or stainless steel (e.g., Sus 316), a bent line 17 for discharging a remaining gas from the gas line box 21 and stabilizing the rate of flow of an introduced gas, and a nitrogen gas purge line 12 for removing remaining gases from the reactor 2 and other components to clean them.

Figure 3:
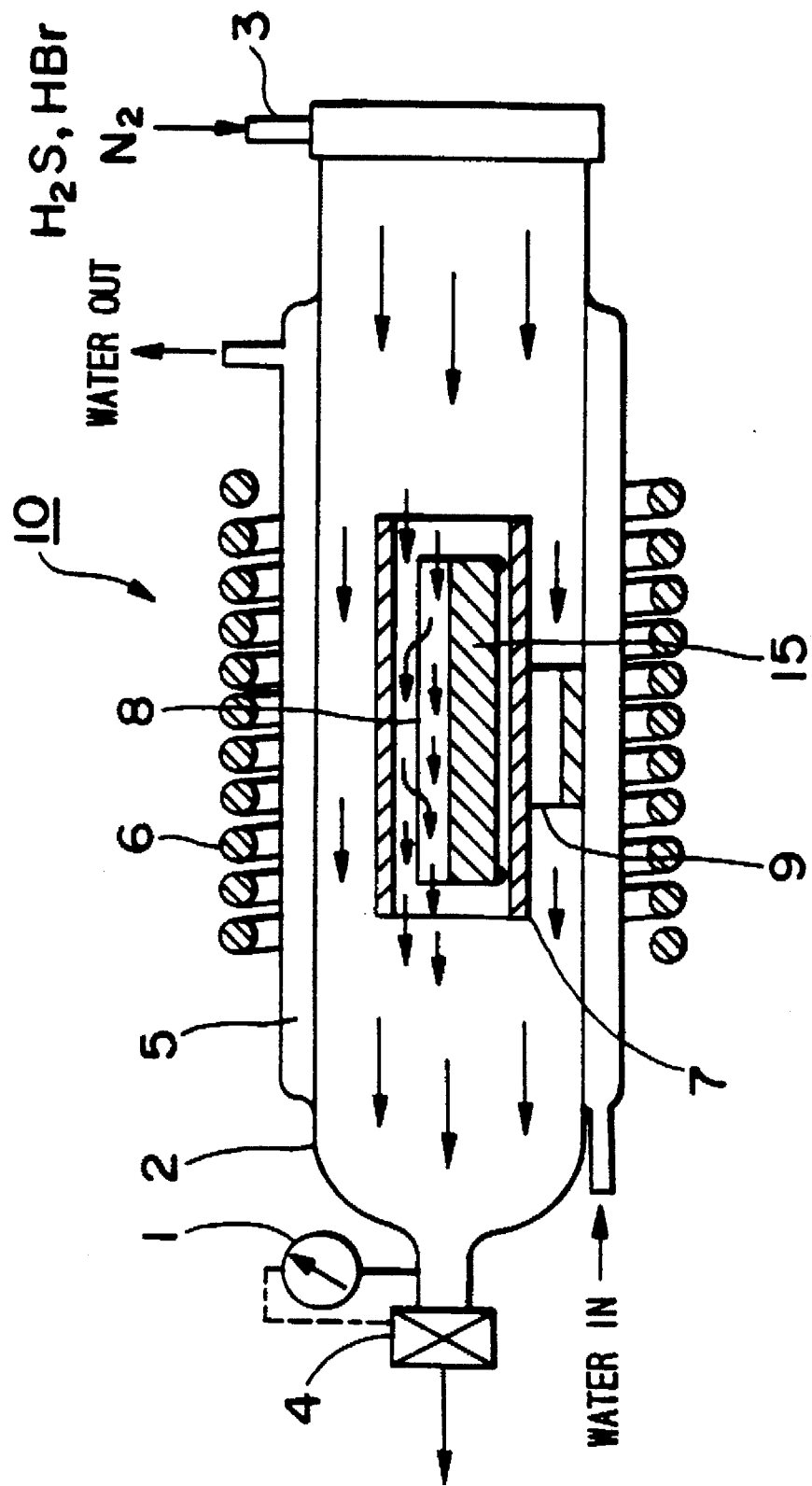
FIG. 3 is a schematic cross-sectional view of a high-frequency induction heating furnace of the apparatus according to the present invention.

As shown in FIG. 3, the high-frequency induction heating furnace 10 comprises a reactor 2 composed of a carbon block 7 and an open boat 8 of quartz, and a high-frequency induction heating coil 6 disposed around the reactor 2 for quickly heating the reactor 2. Details of the high-frequency induction heating furnace 10 will be described later on.

The pressure control section 19 in FIG. 2 comprises a pressure sensor 1 for detecting the pressure in the reactor 2 in a range from depressurization to pressurization, a pressure control valve 4 for setting the pressure in the reactor 2 to a preset level based on a signal from the pressure sensor 1, a vacuum pump 14 (see FIG. 2) for discharging a fluid from the reactor 2 until a given vacuum is created therein, a plurality of valves V1, V2, V3 for changing discharge lines, and a bypass line 18 which is used when the reactor 2 is used under an atmospheric pressure or restored to an atmospheric pressure.

The apparatus also includes a trap 13 for trapping reaction products and dopants, a discharged gas processing device 16 for processing toxic gases by way of adsorption or the like, and a plurality of valves V4~V7 for turning on and off the introduction of a gas and changing gas lines. An optimum sequence is programmed by a controller (not shown) for introducing the gases, operating the valves, and actuating the vacuum pump.

Atmospheric air is prevented from flowing back from a discharge port by a check valve V8.

Operation of the apparatus will be described below. In FIG. 2, the valve V7 is normally open, and the check valve V8 prevents atmospheric air from flowing back from the discharge port. The valves V1 through V6 are normally closed, and the non-illustrated controller is in a standby condition.

When the reactor 2 is evacuated by the vacuum pump 14, the valves V2, V3 are open and the valve V1 is closed. The pressure control valve 4 controls its own opening based on a signal from the pressure sensor 1 to adjust the pressure in the reactor 2 to a preset pressure. In this manner, the pressure in the reactor 2 as it is depressurized below the atmospheric pressure can be controlled by the pressure control valve 4. To control the pressure in the reactor 2 when it is pressurized, a gas is introduced into the reactor 2 until a predetermined pressure is developed therein. When the predetermined pressure is developed in the reactor 2, the valves V2, V3 are closed. When the valves V2, V3 are closed, the atmospheric pressure is introduced into the vacuum pump 14 by a pump leak valve (not shown). When the pressure in the reactor 2 exceeds the atmospheric pressure through the introduction of the gas, the valve 1 is opened, discharging the gas through the discharged gas processing device 16 and the discharge port.

The pressure in the reactor 2 as it is pressurized to a level higher than the atmospheric pressure can be controlled by the pressure control valve 4 which controls its opening based on the signal from the pressure sensor 1. The pressure control valve 4 and the bypass line 18 may be combined to control the pressure in the reactor 2.

The pressure in the reactor 2 can thus be continuously controlled from $10^{-3}$ Torr to 1140 Torr.

The nitrogen gas purge line 12 purges remaining gases and toxic gases such as dopants after a manufacturing process is finished. To keep the apparatus clean without carrying out any manufacturing process, it is preferable to supply a nitrogen gas at all times through the nitrogen purge line 12 and the bypass line 18. The trap 13 which serves to trap dopants to prevent them from flowing back to the reactor 2 may comprise a freezing medium such as liquid nitrogen or an adsorbent.

The reactor 2 can quickly be heated up to 1200° C. by the high-frequency induction heating furnace 10. A material gas can be introduced into the reactor 2 through the gas inlet pipe 11. The reactor 2 has a maximum pressure resistance for withstanding up to a 1.5 atmospheric pressure, and has a sufficient pressure resistance in the pressure control range of from $10^{-3}$ Torr to 1140 Torr.

The high-frequency induction heating furnace 10 will now be described in detail below.

As shown in FIG. 3, the high-frequency induction heating furnace 10 comprises a substantially cylindrical reactor 2, an inlet port 3 on one end of the reactor 2 for introducing a hydrogen sulfide gas, a nitrogen gas, and a halogen gas into the reactor 2, a pressure sensor 1 on the other end of the reactor 2 for detecting the pressure in the reactor 2, a pressure control valve 4 on the other end of the reactor 2 for controlling the pressure in the reactor 2 based on a signal from the pressure sensor 1, a cooling tube 5 disposed around the reactor 2, and a heating coil 6 disposed around the cooling tube 5 and electrically connected to a high-frequency power supply (not shown). The trap 13 is omitted from illustration in FIG. 3.

Figure 4:
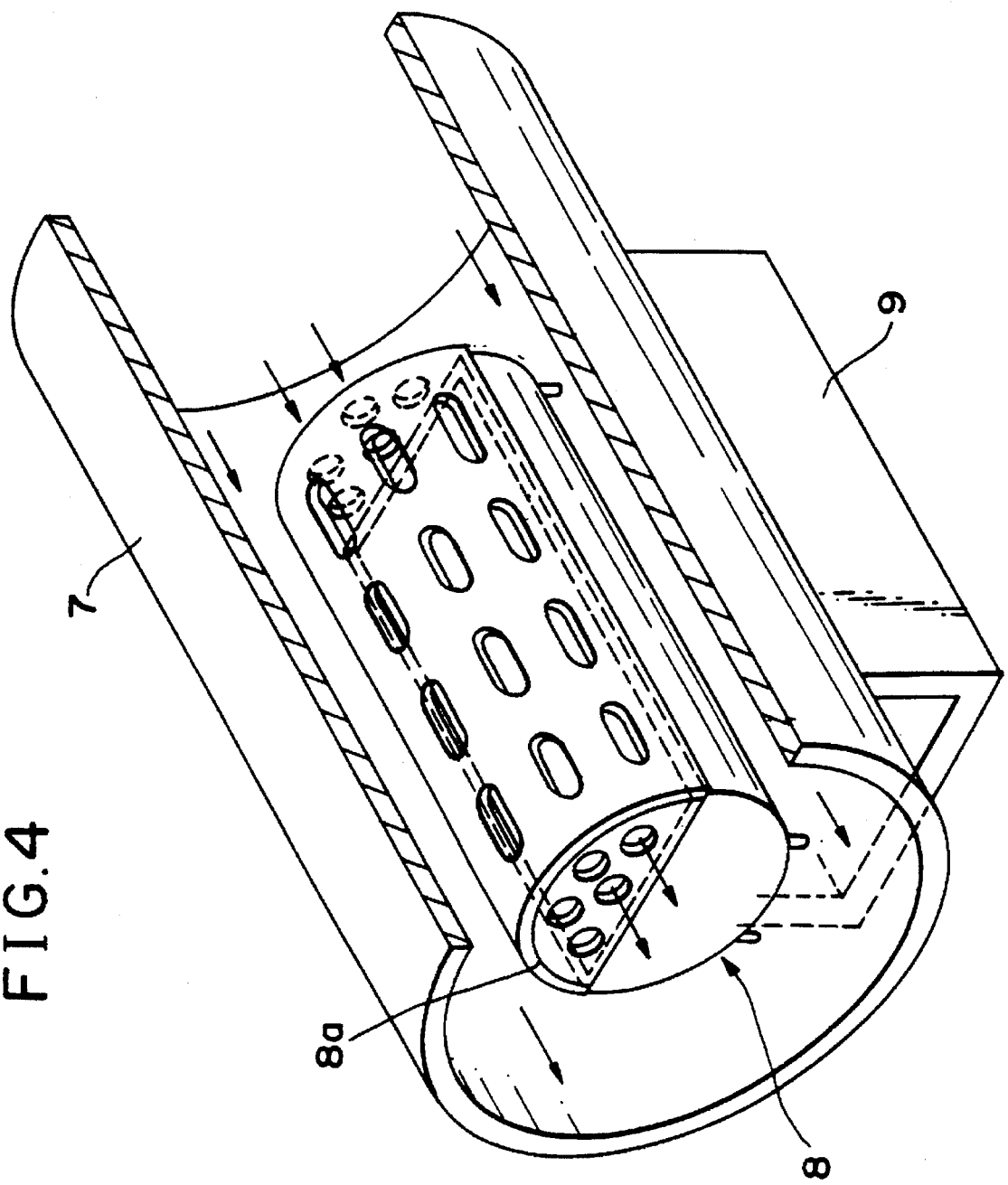
FIG. 4 is a perspective view, partly cut away, of a semicylindrical quartz boat and a storage body which may be employed in the high-frequency induction heating furnace.
Figure 5:
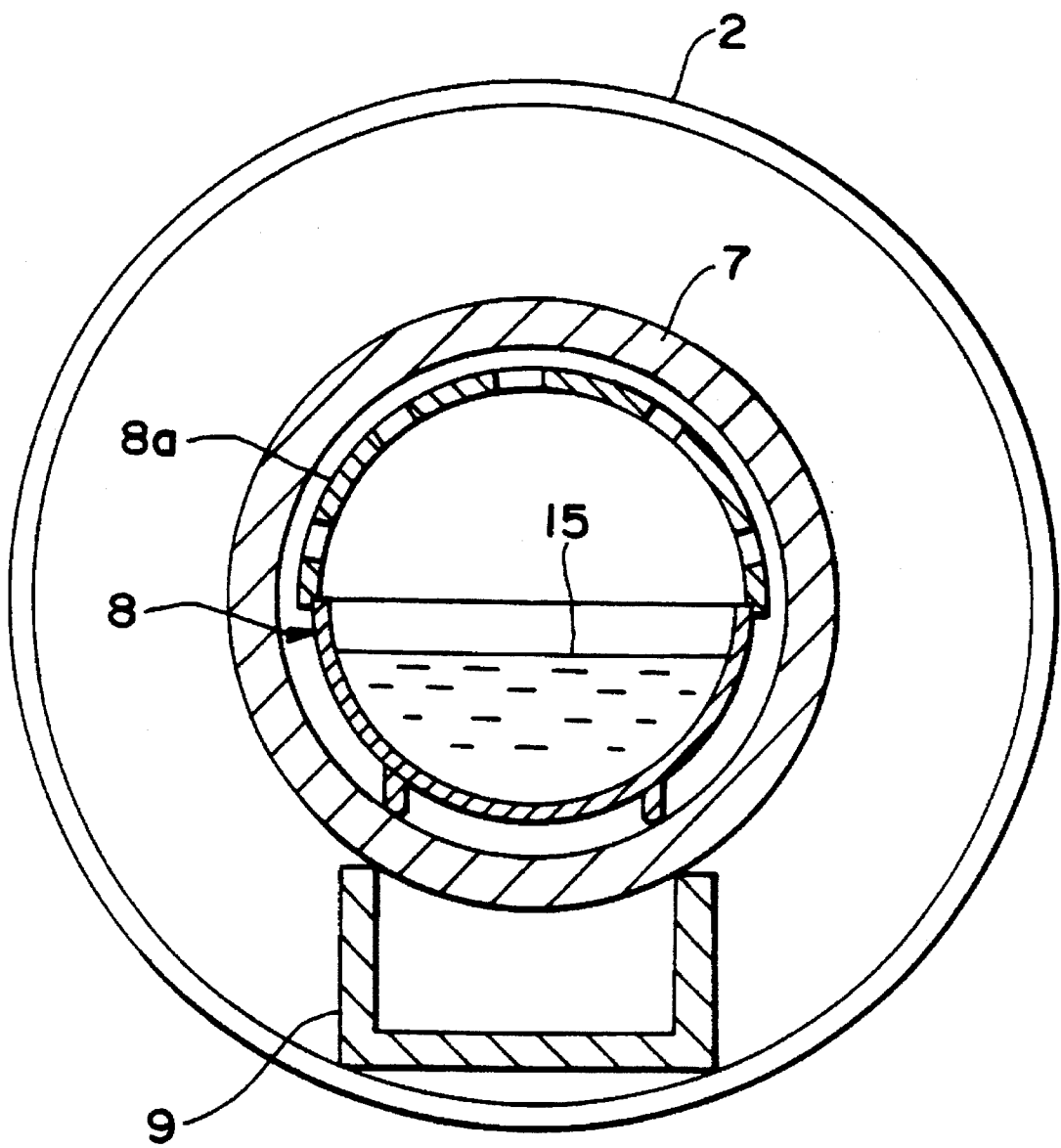
FIG. 5 is a transverse cross-sectional view of the cylindrical quartz boat and the storage body shown in FIG. 4.

As shown in FIGS. 4 and 5, a cylindrical carbon block 7 serving as a storage body of carbon, through which a fluid can axially flow from an upstream end to a downstream end thereof, is removably disposed in the reactor 2, and a semicylindrical quartz boat 8 is disposed in the carbon block 7 with a semicylindrical quartz cover 8a mounted on the quartz boat 8. A material 15 primarily composed of powder of zinc sulfide is placed in the quartz boat 8, and can uniformly be heated by induction heating of the heating coil 6. The quartz cover 8a has a plurality of holes defined therein for allowing a gas to flow therethrough.

The carbon block 7 in the reactor 2 is adjusted in height by a quartz plate 9 in the reactor 2 such that the carbon block 7 is positioned concentrically with the heating coil 6. Therefore, the carbon block 7 is uniformly spaced from the heating coil 6 and hence can uniformly be heated by induction heating of the heating coil 6. The axial region in the carbon block 7 which can be heated by the heating coil 6 is as long as the quartz boat 8, and can be heated by the heating coil 6 to a preset temperature with an error of ±1°~5° C.

In this embodiment, the semicylindrical quartz cover 8a is apertured with a plurality of holes. However, the semicylindrical quartz cover 8a may not be apertured. The gap between the quartz boat 8 and the carbon block 7 is determined depending on the size of the manufacturing apparatus.

Figure 6:
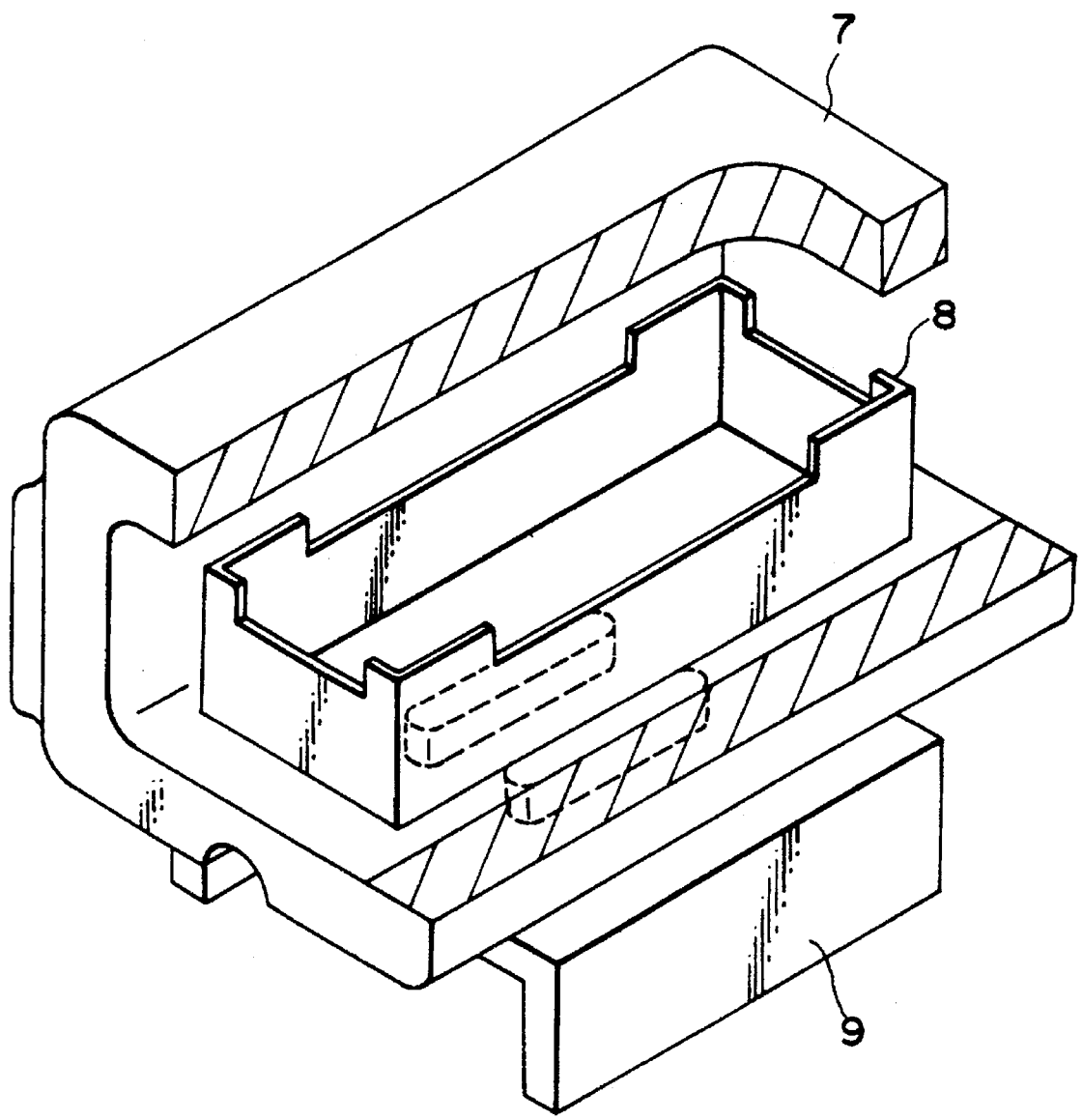
FIG. 6 is a perspective view, partly cut away, of a rectangular quartz boat and a rectangular storage body which may be employed in the high-frequency induction heating furnace.
Figure 7:
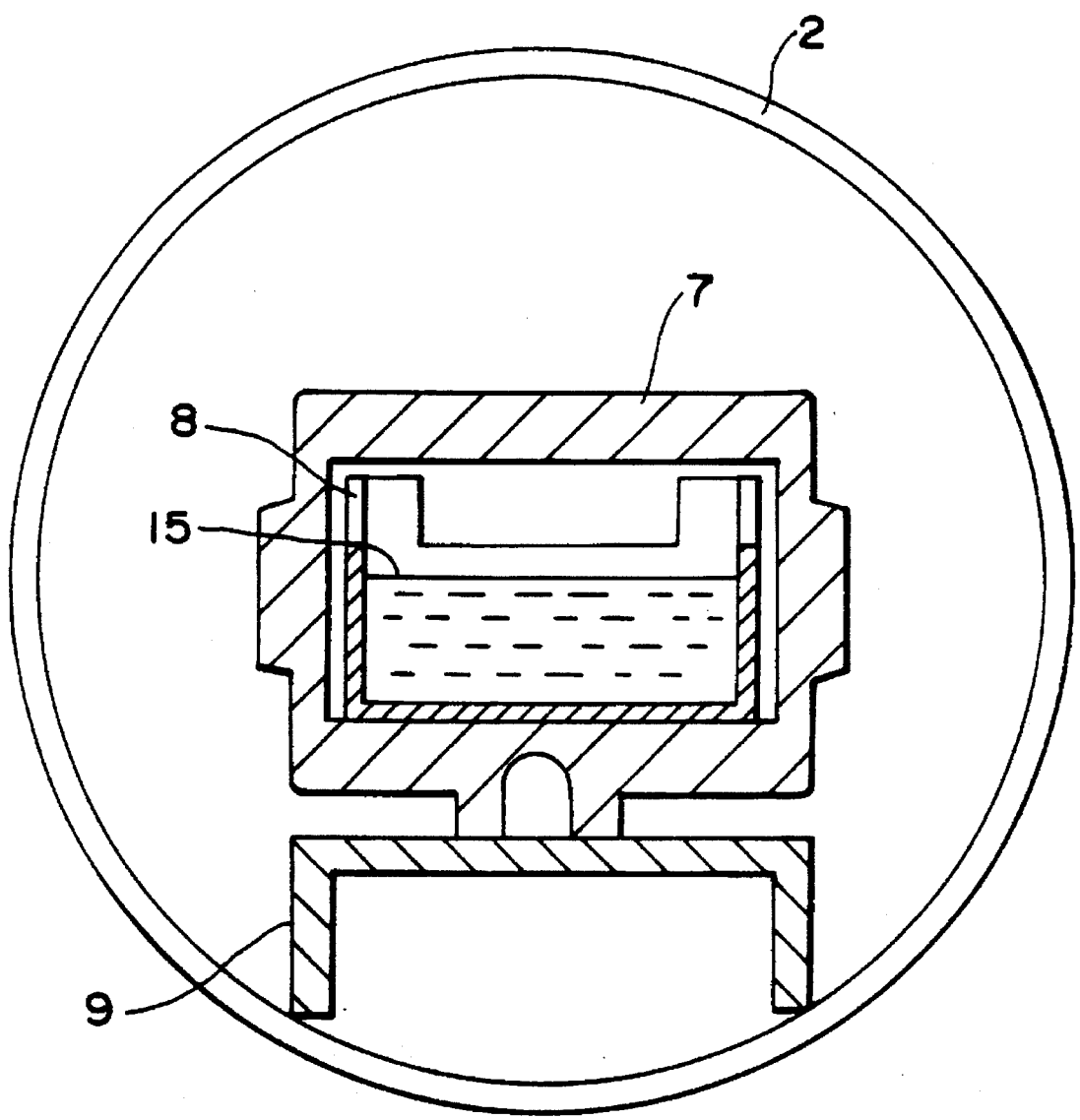
FIG. 7 is a transverse cross-sectional view of the cylindrical quartz boat and the storage body shown in FIG. 6.

FIGS. 6 and 7 show a carbon block and a quartz boat according to another embodiment of the present invention. As shown in FIGS. 6 and 7, each of a carbon block 7 and a quartz boat 8 is of a rectangular shape and has a structure capable of passing a gas therethrough from an upstream end to a downstream end thereof. The carbon block 7 is disposed in a confronting relationship to a material 15 placed in the quartz boat 8. When the carbon block 7 is uniformly heated by induction heating, the material 15 is also uniformly heated. The carbon block 7 has different thicknesses to provide different thermal capacities for permitting the material 15 as it is melted to undergo natural convection without stagnation. Specifically, the carbon block 7 has opposite vertical panels thicker than other panels thereof. The carbon block 7 is adjusted in height by a quartz plate 9 so as to be positioned at the center of the reactor 2.

In the manufacturing apparatus, the carbon block 7 and the quartz boat 8 are employed, and a halogen gas such as of a bromine, chlorine, or iodine is introduced to manufacture an EL phosphor. The manufacturing apparatus can control the concentration of a dopant in a range of from 0 to 0.5 mol %, and is not required to take into account subliming points as is the case with the conventional manufacturing apparatus in which ammonium bromide or ammonium chloride is employed.

A process of manufacturing an EL phosphor for use in a display device such as an EL panel with the high-frequency induction heating furnace 10 will be described below.

First, a material primarily composed of powder of zinc sulfide is placed in the quartz boat 8, and the quartz boat 8 is closed by the quartz cover 8a. The quartz boat 8 with the quartz cover 8a is then placed in the carbon block 7, which is then stored in the reactor 2 of the high-frequency induction heating furnace 10.

Then, the temperature in reactor 2 is set to a temperature in the range of from 550° C. to 1200° C., and the pressure in the reactor 2 is set to a pressure level in the range of from 780 Torr to 1050 Torr. In this pressure range, no change occurs in the characteristics of the EL phosphor. The pressure in the reactor 2 is set to an optimum pressure level in this pressure range in view of other conditions such as a gas flow rate, a dopant concentration, and a growth time.

If the material 15 were fired under a pressure lower than the atmospheric pressure, then the produced EL phosphor would suffer characteristic variations due to different degrees of reaction in upper and lower layers of the material 15. Therefore, it is preferable to fire the material 15 at a pressure equal to or higher than the atmospheric pressure.

While the temperature and the pressure in the reactor are being thus controlled, the material 15 is fired for a predetermined period of time by high-frequency induction heating of the heating coil 6 in an atmosphere of a halogen gas as a coactivator, e.g., a hydrogen bromide (HBr) gas, and a hydrogen sulfide gas, thus producing an EL phosphor.

Thereafter, the EL phosphor is cooled to room temperature in a nitrogen gas atmosphere while the pressure is being kept in the reactor 2. Then, the EL phosphor is taken out of the reactor 2, washed, and then dried into an EL phosphor product.

While the material 15 is being fired, it is exposed to the atmosphere of halogen gases as coactivators under a pressure of 900 Torr, for example. Therefore, particle sizes and impurity concentrations of the produced EL phosphor suffer minimum variations. Consequently, it is possible to produce an EL phosphor of good emission characteristics with high reproducibility.

Examples of the present invention will be described below.

INVENTION EXAMPLES

Powder of zinc sulfide was well mixed with 0.5 mol % of copper sulfate powder, and the mixture was placed as a material 15 in the quartz boat. The quartz boat was then housed in the cylindrical carbon block 7 through which a fluid can flow. The carbon block 7 was then put in the reactor 2 of the high-frequency induction heating furnace 10, which was then evacuated to a pressure of about $10^{-3}$ Torr. Then, while the interior of the reactor 2 was being pressurized to a pressure of 900 Torr by the pressure control valve 4, a nitrogen ($N_2$) gas was introduced into the reactor 2 at a rate of 1000 cc per minute. The rate at which the nitrogen gas is introduced into the reactor 2 should be as large as possible.

Then, the material 15 in the quartz boat 8 was heated by high-frequency induction heating of the heating coil 6 while under the pressure of 900 Torr.

When the temperature of the material 15 reached 700° C., a halogen gas was introduced into the reactor 2 at a rate of 300 cc per minute. Then, the material 15 was fired for about 30 minutes.

Subsequently, for promoting particle size growth, a hydrogen sulfide gas was introduced into the reactor 2 at a rate of 200 cc per minute, and then the material 15 was fired for about 6 hours. While the material 15 was being fired, the pressure in the reactor 2 was maintained at 900 Torr.

Thereafter, the heating coil 6 was de-energized, and the fired material 15 was cooled in the nitrogen gas under the pressure of 900 Torr in order to prevent oxidization of the fired material 15. When cooled, the fired material 15 was removed from the reactor 2. Excessive copper was then washed away from the surface of the fired material 15 by a solution of 20% of KCN, and then the fired material 15 was dried into an EL phosphor for use in a display device. The above process was repeated four times to produce four EL phosphors.

The produced EL phosphors were measured for a copper concentration, a bromine concentration, and an average particle size. The results of the measurement are shown in the Table 1 below.

TABLE 1

| | Copper concentration (mol %) | Bromine concentration (mol %) | Average particle size (μm) |
| --- | --- | --- | --- |
| 1 | 0.221 | 0.209 | 11.11 |
| 2 | 0.220 | 0.209 | 11.33 |
| 3 | 0.214 | 0.209 | 11.43 |
| 4 | 0.215 | 0.209 | 11.18 |
| σ | 0.004 | 0 | 0.14 |

(σ: Standard deviation)

COMPARATIVE EXAMPLES

Figure 1:
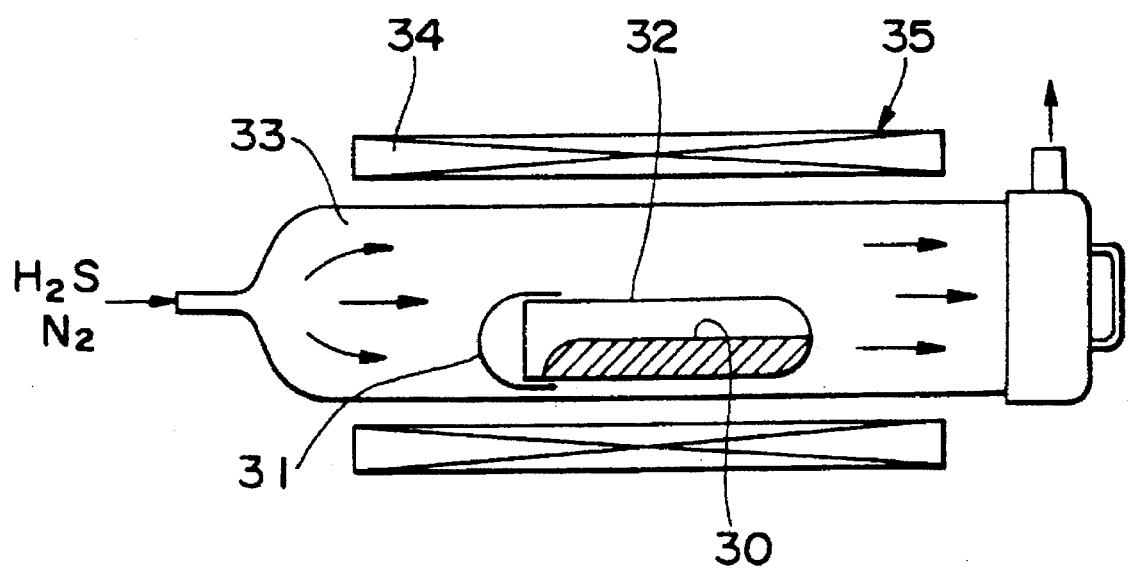
FIG. 1 is a schematic cross-sectional view of an electric furnace which is used in the manufacture of a conventional EL phosphor.

Powder of zinc sulfide was well mixed with 0.5 mol % of copper sulfate powder and 10 mol % of ammonium bromide, and the mixture was placed as a material in the quartz ampul 32 (see FIG. 1). The quartz ampul 32 was then closed by the quartz cap 31, and then placed in the electric furnace 32 which was heated to 900° C. and through which a nitrogen gas flowed. When the temperature was stabilized in about 10 minutes, the mixture was fired for about 4 hours while a hydrogen sulfide gas was flowing through the electric furnace 32.

The fired material was then washed by a solution of 20% of KCN, and then by water, after which the fired material was dried into an EL phosphor for use in a display device. The above process was repeated five times to produce five EL phosphors.

The process temperature in the Inventive Example was 700° C. and the process temperature in the Comparative Example was 900° C. because it was desirable to compare the produced EL phosphors with respect to the same particle size of about 10 μm. The particle size of EL phosphors should preferably range from 10 to 30 μm, and the particle size growth is controlled by adjusting process parameters including the temperature, the firing time, etc.

The produced EL phosphors in the Comparative Example were measured for a copper concentration, a bromine concentration, and an average particle size. The results of the measurement are shown in the Table 2 below.

TABLE 2

| | Copper concentration (mol %) | Bromine concentration (mol %) | Average particle size (μm) |
| --- | --- | --- | --- |
| 1 | 0.233 | 0.225 | 10.1 |
| 2 | 0.231 | 0.224 | 9.3 |
| 3 | 0.239 | 0.235 | 9.8 |
| 4 | 0.218 | 0.216 | 9.5 |
| 5 | 0.249 | 0.243 | 8.3 |
| σ | 0.011 | 0.0011 | 0.69 |

(σ: Standard deviation)

As is apparent from the Tables 1 and 2 above, the copper concentration, the bromine concentration, and the average particle size of the EL phosphors produced in the Inventive Example by the apparatus according to the present invention suffered less variations or fluctuations than those of the EL phosphors produced in the Comparative Example, and the EL phosphors produced in the Inventive Example had a standard deviation σ largely different from that of the EL phosphors produced in the Comparative Example. It has therefore been found out that it is possible to produce EL phosphors of good emission characteristics for use in display devices with high reproducibility according to the present invention.

Since the carbon block is quickly heated uniformly to a preset temperature by inducting heating, the powder of zinc sulfide placed in the carbon block can be heated highly uniformly. The uniform heating of the powder of zinc sulfide allows very good crystal growth, and hence emission characteristics of good reproducibility can be achieved.

With the present invention, as described above, there can be produced an EL phosphor of good emission characteristics having minimum particle size and impurity concentration irregularities with high reproducibility.

Furthermore, the apparatus according to the present invention can produce an EL phosphor of good emission characteristics having minimum particle size and impurity concentration irregularities with high reproducibility, by exposing a material primarily composed of zinc sulfide powder to an atmosphere of a halogen gas as a coactivator under a predetermined pressure while the material is being fired in a heating furnace, preferably a high-frequency induction heating furnace.

Although a certain preferred embodiment of the present invention has been shown and described in detail, it should be understood that various changes and modifications may be made therein without departing from the scope of the appended claims.

What is claimed is:

1. A method of manufacturing phosphor, comprising the steps of:
   placing material comprising a mixture of zinc sulfide powder and copper sulfate powder into a heating vessel;
   placing the heating vessel into a fluid permeable storage body;
   placing the storage body into a reactor of an induction heating furnace;
   pressurizing nitrogen atmosphere of the reactor at a predetermined pressure, ranging from $10^{-3}$ Torr to 1140 Torr, when introducing the nitrogen gas;
   heating the mixed material at the predetermined pressure when introducing the nitrogen gas;
   introducing halogen gas into the reactor when reaching a predetermined temperature ranging from 550° C. to 1200° C.; and firing the mixture into an atmosphere of the nitrogen gas and the halogen gas as a coactivator, while keeping the interior of the reactor at the predetermined temperature and the predetermined pressure.

2. The method of manufacturing phosphor according to claim 1, wherein said predetermined temperature ranges from 550° C. to 1200° C., and said predetermined pressure ranges from 780 Torr to 1050 Torr.

3. The method of manufacturing phosphor according to claim 1, further comprising the step of adding a dopant to the mixture, to a final concentration in the range 0 to 0.5 mol % in the atmosphere of the nitrogen gas and the halogen gas when the predetermined pressure ranges from 780 Torr to 1050 Torr, and the predetermined temperature ranges from 550° C. to 1200° C.

* * * * *